United States Patent
Ishikawa et al.

(10) Patent No.: US 10,106,660 B2
(45) Date of Patent: Oct. 23, 2018

(54) FILM CONTAINING A RESIN HAVING A THIOURETHANE BOND AND USES THEREOF

(71) Applicant: Mitsui Chemicals, Inc., Minato-ku, Tokyo (JP)

(72) Inventors: Hisako Ishikawa, Ichihara (JP); Toshinori Matsuda, Ichihara (JP); Yosuke Ono, Ichihara (JP); Kazuo Yagi, Hiroshima (JP); Akifumi Kagayama, Chiba (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 344 days.

(21) Appl. No.: 15/160,828

(22) Filed: May 20, 2016

(65) Prior Publication Data

US 2016/0264743 A1 Sep. 15, 2016

Related U.S. Application Data

(62) Division of application No. 13/509,015, filed as application No. PCT/JP2010/006635 on Nov. 11, 2010, now abandoned.

(30) Foreign Application Priority Data

Nov. 13, 2009 (JP) ................................. 2009-260449
Mar. 24, 2010 (JP) ................................. 2010-067563

(51) Int. Cl.
| | | |
|---|---|---|
| C08J 5/18 | (2006.01) | |
| C08G 18/38 | (2006.01) | |
| C09D 175/04 | (2006.01) | |
| G02B 1/111 | (2015.01) | |
| G02B 5/04 | (2006.01) | |
| G02B 5/08 | (2006.01) | |
| G02B 5/20 | (2006.01) | |
| G02B 5/30 | (2006.01) | |
| C08G 18/76 | (2006.01) | |
| G02B 1/18 | (2015.01) | |
| B29C 41/00 | (2006.01) | |
| B29D 11/00 | (2006.01) | |
| G02B 5/02 | (2006.01) | |
| B29K 75/00 | (2006.01) | |
| B29L 11/00 | (2006.01) | |

(52) U.S. Cl.
CPC ............... *C08J 5/18* (2013.01); *B29C 41/003* (2013.01); *B29D 11/00788* (2013.01); *C08G 18/3876* (2013.01); *C08G 18/7621* (2013.01); *C08G 18/7642* (2013.01); *C08G 18/7671* (2013.01); *C09D 175/04* (2013.01); *G02B 1/111* (2013.01); *G02B 1/18* (2015.01); *G02B 5/045* (2013.01); *G02B 5/0841* (2013.01); *G02B 5/208* (2013.01); *G02B 5/3033* (2013.01); *G02B 5/3083* (2013.01); *B29K 2075/00* (2013.01); *B29L 2011/00* (2013.01); *C08J 2375/04* (2013.01); *G02B 5/021* (2013.01); *Y10T 428/31551* (2015.04)

(58) Field of Classification Search
None
See application file for complete search history.

(56) References Cited

U.S. PATENT DOCUMENTS

| | | |
|---|---|---|
| 5,087,758 A | 2/1992 | Kanemura et al. |
| 5,191,055 A | 3/1993 | Kanemura et al. |
| 5,194,559 A | 3/1993 | Okazaki et al. |
| 5,908,876 A | 6/1999 | Fujii et al. |
| 6,019,915 A | 2/2000 | Fujii et al. |
| 6,407,866 B1 | 6/2002 | Yamashita et al. |
| 7,244,808 B2 | 7/2007 | Tanaka et al. |
| 2004/0012734 A1 | 1/2004 | Yamanaka et al. |
| 2009/0227745 A1* | 9/2009 | Kohgo ............... C08G 18/3876 525/453 |

FOREIGN PATENT DOCUMENTS

| | | |
|---|---|---|
| EP | 1743912 A1 | 1/2007 |
| JP | 2-270859 A | 11/1990 |
| JP | 9-324023 A | 12/1997 |
| JP | 10-114825 A | 5/1998 |
| JP | 2002-275232 A | 9/2002 |
| JP | 2005-336476 A | 12/2005 |
| JP | 2005-338109 A | 12/2005 |
| JP | 2007-246690 A | 9/2007 |
| WO | WO 2007/097116 A1 | 8/2007 |

OTHER PUBLICATIONS

International Search Report (PCT/ISA/210) dated Dec. 7, 2010, by the Japanese Patent Office as the International Searching Authority for International Application No. PCT/JP2010/006635.
Extended Search Report dated Dec. 9, 2013, by the European Patent Office in corresponding European Patent Application No. 10829714. 4-1306 (5 pages).

* cited by examiner

Primary Examiner — Erma C Cameron
(74) Attorney, Agent, or Firm — Buchanan, Ingersoll & Rooney PC

(57) ABSTRACT

Disclosed is a film composed of a resin having a thiourethane bond, wherein the molar ratio (S/N) of sulfur to nitrogen contained in the resin is equal to or more than 0.8 and less than 3. A method for manufacturing a film is also disclosed. The disclosed film is excellent in a balance among high refractive index, low birefringence and light transmittance, and further excellent in a balance of mechanical characteristics such as toughness, hardness and dimensional stability, so that effects of deformation and the like during processing are very small, and the film is further excellent in solvent resistance as well.

5 Claims, No Drawings

FILM CONTAINING A RESIN HAVING A THIOURETHANE BOND AND USES THEREOF

TECHNICAL FIELD

The present invention relates to a film and uses of the film.

BACKGROUND ART

Patent Document 1 discloses an optical material composed of a thiourethane resin. Furthermore, Patent Document 2 discloses an optical material composed of polythiourethane produced by the use of a prescribed catalyst. According to the documents, these resins have a high refractive index and high transparency, and can be suitably used for optical lenses among optical materials.

However, the documents do not disclose physical properties when a thiourethane resin is formed into a film at a thickness of equal to or less than 1 mm, and a method of controlling transmission of light as a whole by the use in contact with other materials in a thin film form. Furthermore, when these resins are made into a thin film, there are difficulties in coating from the viewpoint of reactivity of a raw material, and a method of obtaining a stable film or thin film is not reviewed either.

Patent Document 3 discloses an optical material having a structure in which a polythiourethane skeleton is introduced into a polythiocarbonate skeleton. According to the document, the resulting film from the optical material is excellent in optical properties such as high refractive index, high Abbe's number and the like, and further excellent in mechanical properties such as tensile properties, high elasticity and the like. The document discloses a case in which a film is formed from the aforementioned optical material by a casting (solution casting) method of a resin solution.

RELATED DOCUMENT

Patent Document

Patent Document 1: Japanese Laid-open Patent Publication No. 1990-270859
Patent Document 2: International Publication (WO) No. 2007/97116
Patent Document 3: Japanese Laid-open Patent Publication No. 2005-336476

DISCLOSURE OF THE INVENTION

However, the resin as disclosed in the above document 3 involves many steps in synthesis, so that there are problems in maintenance of a quality and the cost when the resin is made into a film. Furthermore, a method of forming a film from the resin described in the above document 3 also requires extra effort and the cost for removing the solvent at the time of production thereof due to cast (solution casting) with a solution after completion of polymerization, there are difficulties in controlling the degree of polymerization and thickness, and there are many rooms for improvement in a balance among refractive index, birefringence and light transmittance of the formed film.

That is, the present invention is specified by matters described in below:

(1) A film comprising a resin having a thiourethane bond, wherein the molar ratio (S/N) of sulfur to nitrogen contained in said resin is equal to or more than 0.8 and less than 3.

(2) The film according to (1), wherein the refractive index in a sodium D line is equal to or more than 1.6, the in-plane birefringence $\Delta n_{xy}$ of a film having a film thickness of 1 to 200 μm at a wavelength 590 nm is equal to or less than $1.0 \times 10^{-2}$, the birefringence $\Delta n_{xz}$ in the thickness direction is equal to or less than $1.0 \times 10^{-3}$, and the mean value of the light transmittance to the light having a wavelength 400 to 800 nm is equal to or more than 80%.

(3) The film according to (1) or (2), wherein the resin having a thiourethane bond has an aromatic group, a heterocyclic group or an alicyclic group in the structure.

(4) The film according to any one of (1) to (3), obtained by a casting (thin film coating-polymerization curing) method.

(5) The film according to any one of (1) to (3), containing partially a thiourethane bond, and further obtained by a casting method from a mixture of a compound having an isocyanate group and a compound having a thiol group, which is capable of forming a thiourethane.

(6) The film according to any one of (1) to (3), containing partially a thiourethane bond, and further obtained by injecting a mixture of a compound having an isocyanate group and a compound having a thiol group, which is capable of forming a thiourethane between surfaces of a space of equal to or less than 200 μm and polymerizing and curing the mixture.

(7) The film according to (5) or (6), wherein said compound having a thiol group contains at least one kind of compounds having three or more mercapto groups.

(8) An optical film composed of the film according to any one of (1) to (7).

(9) An optical member, wherein the optical film according to (8) is formed inside or outside thereof.

(10) A display equipped with the optical film according to (8).

(11) A light emitting device, wherein the optical film according to (8) is formed inside or outside thereof.

(12) A lighting device using the light emitting device according to (11).

(13) An image display device using the light emitting device according to (11).

Incidentally, the film of the present invention also includes a sheet-like film, and further includes the case that a thin film obtained by coating and curing on a substrate is used with the substrate.

The film of the present invention is excellent in a balance among high refractive index, low birefringence and light transmittance, and further excellent in a balance of mechanical characteristics toughness, hardness, dimensional stability and the like, so that effects of deformation and the like during processing are very small, while the film is further excellent in solvent resistance as well, so that the film can be used as various optical films.

DESCRIPTION OF EMBODIMENTS

The present invention will be described in more detail below.

Film

The film of the present invention is composed of a resin having a thiourethane bond. The resin constituting the film of the present invention has the number of sulfur atoms which is relatively smaller than the number of thiourethane bonds, that is, polymerization reaction bonds, and consequently the polymerization process is made in a relatively simple manner. The molar ratio (S/N) of sulfur to nitrogen contained in the resin is equal to or more than 0.8 and less than 3, preferably equal to or more than 0.8 and equal to or less than 2.8, and further preferably equal to or more than 0.9 and equal to or less than 2.2.

When the molar ratio (S/N) of sulfur to nitrogen is in the aforementioned range, the film of the present invention is excellent in a balance of optical properties such as high refractive index, low birefringence, light transmittance and the like, and further excellent in mechanical characteristics such as toughness and solvent resistance as well.

Specifically, the film has the properties as described below.

The refractive index in a sodium D line is equal to or more than 1.6 and preferably equal to or more than 1.64.

The in-plane birefringence $\Delta n_{xy}$ of a film having a film thickness of 1 to 200 μm at a wavelength 590 nm is equal to or less $1.0 \times 10^{-2}$, preferably equal to or less than $1.0 \times 10^{-3}$, more preferably equal to or less than $2.0 \times 10^{-5}$, and further preferably equal to or less than $1.1 \times 10^{-5}$. Furthermore, the birefringence $\Delta n_{xz}$ in the thickness direction is equal to or less than $1.0 \times 10^{-3}$ and further preferably equal to or less than $8.0 \times 10^4$.

The average light transmittance to the light having a wavelength 400 to 800 nm is equal to or more than 80%, preferably equal to or more than 85%, and further preferably equal to or more than 88%.

The front birefringence $\Delta n_{xy}$ is defined by nx-ny, while the in-plane retardation Re is defined by $\Delta n_{xy} \times d$ (wherein $n_x$ represents the refractive index in the in-plane delayed-phase direction of the resin film; $n_y$ represents the refractive index in the in-plane advanced-phase direction of the resin film (unit: nm)).

Meanwhile, the birefringence in the thickness direction, $\Delta n_{xz}$, is defined by (nx+ny)/2−nz, while the retardation in the thickness direction, Rth, is defined by $\Delta n_{xz} \times d$ (wherein $n_x$ represents the refractive index in the in-plane delayed-phase direction of the resin film; $n_y$ represents the refractive index in the in-plane advanced-phase direction of the resin film, $n_z$ represents the refractive index in the film thickness direction, and d is a film thickness (unit: nm)).

The film of the present invention is excellent in a balance among high refractive index, low birefringence and light transmittance, so that the film can be suitably used for optical applications. Furthermore, the film of the present invention is excellent in strong toughness, and also excellent insolvent resistance because the film is composed of a thermosetting resin. Incidentally, the above numerical range may be used in any combination.

For the film of the present invention, the breaking elongation is from 3 to 6%. Furthermore, the tensile modulus measured by a test for tensile strength is equal to or more than 3 GPa. Since the film is excellent in these mechanical characteristics, for the products obtained by using the film of the present invention, the yield rate thereof is improved and at the same time product reliability is improved. Thus, the film can be further suitably used for various optical films.

Meanwhile, the film of the present invention has a thickness of from 0.1 to 1,000 μm, and a film having a thickness of 1 to 1,000 μm can also be used. From the viewpoint of low birefringence, the thickness is preferably from 0.1 to 200 μm. In case of a self-support film used by peeling off from the base material after coating, polymerizing and curing a thin film on a base material, or used by peeling off from the mold after cast polymerization, the thickness is particularly preferably from 10 to 200 μm.

Because of excellent barrier properties of various gases such as water vapor, oxygen and the like, particularly water vapor barrier properties, the film can be used as a transparent base material of a liquid crystal display, a solar cell, an organic electroluminescence device and the like.

When the water vapor transmittance rate of the film of the present invention is measured under the conditions of a temperature of 60 degrees centigrade, a humidity of 90% RH and a film thickness of 100 μm in accordance with JIS Z0208, the value is equal to or less than 10 g/m²·24 hr.

Hereinafter, the resin having a thiourethane bond constituting the film of the present invention will be described.

Resin Having a Thiourethane Bond

A sulfur atom-containing resin having a thiourethane bond used in the present invention is obtained by polymerizing the following polymerizable composition.

The polymerizable composition is mainly composed of one or more kinds of isocyanates selected from the group consisting of an isocyanate compound and an isothiocyanate compound, and one or more kinds of active hydrogen compounds having a mercapto group. However, for the purpose of modifying the polythiourethane resin, a hydroxy compound may further be added.

In the present invention, concrete examples of the isocyanate compound which is preferably used as a raw material of the resin having a thiourethane bond include monofunctional isocyanate compounds such as methyl isocyanate, ethyl isocyanate, n-propyl isocyanate, isopropyl isocyanate, n-butyl isocyanate, sec-butyl isocyanate, tert-butyl isocyanate, pentyl isocyanate, hexyl isocyanate, heptyl isocyanate, octyl isocyanate, decyl isocyanate, lauryl isocyanate, myristyl isocyanate, octadecyl isocyanate, 3-pentyl isocyanate, 2-ethylhexyl isocyanate, 2,3-dimethylcyclohexyl isocyanate, 2-methoxyphenyl isocyanate, 4-methoxyphenyl isocyanate, α-methylbenzyl isocyanate, phenylethyl isocyanate, phenyl isocyanate, o-, m-, or p-tolyl isocyanate, cyclohexyl isocyanate, benzyl isocyanate, isocyanatomethylbicycloheptane and the like; aliphatic polyisocyanate compounds such as hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecatriisocyanate, 1,3,6-hexamethylene triisocyanate, 1,8-diisocyanato-4-isocyanatomethyloctane, bis(isocyanatoethyl) carbonate, bis(isocyanatoethyl)ether, lysine diisocyanatomethyl ester, lysine triisocyanate and the like; alicyclic polyisocyanate compounds such as isophorone diisocyanate, 1,3-bis(isocyanatomethyl)cyclohexane, 1,4-bis(isocyanatomethyl)cyclohexane, dicyclohexylmethane diisocyanate, cyclohexane diisocyanate, methylcyclohexane diisocyanate, dicyclohexyldimethylmethane isocyanate, 2,2-dimethyldicyclohexylmethane isocyanate, 2,5-bis(isocyanatomethyl)bicyclo-[2,2,1]-heptane, 2,6-bis(isocyanatomethyl)bicyclo-[2,2,1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane and the like; aromatic polyisocyanate compounds such as phenylene diisocyanate, o-xylylene diisocyanate, p-xylylene diisocyanate, m-xylylene diisocyanate, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethyl)diphenyl ether, phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4-diphenylmethane diisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, phenylisocyanatoethyl isocyanate, hexahydrobenzene diisocyanate, hexahydrodiphenylmethane-4,4-diisocyanate, bis(isocyanatoethyl)phthalate, mesitylylene triisocyanate, 2,6-di(isocyanatomethyl)furan and the like; sulfur-containing aliphatic polyisocyanate compounds such as bis(isocyanatoethyl)sulfide, bis(isocyanatopropyl)sulfide, bis(isocyanatohexyl)sulfide, bis(isocyanatomethyl)sulfone, bis(isocyanatomethyl)disulfide, bis(isocyanatopropyl)disulfide, bis(isocyanatomethylthio)methane, bis(isocyanatoethylthio)methane, bis(isocyanatoethylthio)ethane, bis(isocyanatomethylthio)ethane, 1,5-diisocyanato-2-isocyanatomethyl-3-thiapentane and the like; sulfur-containing aromatic polyisocyanate compounds such as diphenyl sulfide-2,4-diisocyanate, diphenyl sulfide-4,4-diisocyanate, 3,3-dimethoxy-4,4-diisocyanatodibenzylthioether, bis(4-isocyanatomethylbenzene)sulfide, 4,4-methoxybenzenethioethylene glycol-3,3-diisocyanate, diphenyl disulfide-4,4-diisocyanate, 2,2-dimethyldiphenyl disulfide-5,5-diisocyanate, 3,3-dimethyldiphenyl disulfide-5,5-diisocyanate, 3,3-dimethyldiphenyl disulfide-6,6-diisocyanate, 4,4-dimethyldiphenyl disulfide-5,5-diisocyanate, 3,3-dimethoxydiphenyl disulfide-4,4-diisocyanate, 4,4-dimethoxydiphenyl disulfide-3,3-diisocyanate and the like; and sulfur-containing heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, 4,5-bis(isocyanatomethyl)-2-methyl-1,3-dithiolane and the like. However, the present invention is not limited to these exemplified compounds.

Their halogen substituted compounds such as chlorine substituted compounds, bromine substituted compounds and the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products, and the like may be employed. These isocyanate compounds may be used singly, or two or more kinds thereof may be used in combination.

In the present invention, an isothiocyanate compound which is used as a raw material of the resin having a thiourethane bond is selected from an isothiocyanate compound and an isothiocyanate compound having an isocyanate group.

Concrete examples of the isothiocyanate compound which is preferably used in the present invention include monofunctional isothiocyanate compounds such as methyl isothiocyanate, ethyl isothiocyanate, n-propyl isothiocyanate, isopropyl isothiocyanate, n-butyl isothiocyanate, sec-butyl isothiocyanate, tert-butyl isothiocyanate, pentyl isothiocyanate, hexyl isothiocyanate, heptyl isothiocyanate, octyl isothiocyanate, decyl isothiocyanate, lauryl isothiocyanate, myristyl isothiocyanate, octadecyl isothiocyanate, 3-pentyl isothiocyanate, 2-ethylhexyl isothiocyanate, 2,3-dimethylcyclohexyl isothiocyanate, 2-methoxyphenyl isothiocyanate, 4-methoxyphenyl isothiocyanate, α-methylbenzyl isothiocyanate, phenylethyl isothiocyanate, phenyl isothiocyanate, o-, m-, or p-tolyl isothiocyanate, cyclohexyl isothiocyanate, benzyl isothiocyanate, isothiocyanatomethylbicycloheptane and the like; aliphatic polyisothiocyanate compounds such as hexamethylene diisothiocyanate, 2,2-dimethylpentane diisothiocyanate, 2,2,4-trimethylhexane diisothiocyanate, butene diisothiocyanate, 1,3-butadiene-1,4-diisothiocyanate, 2,4,4-trimethylhexamethylene diisothiocyanate, 1,6,11-undecatriisothiocyanate, 1,3,6-hexamethylene triisothiocyanate, 1,8-diisothiocyanato-4-isothiocyanatomethyloctane, bis(isothiocyanatoethyl)carbonate, bis(isothiocyanatoethyl)ether, lysine diisothiocyanatomethyl ester, lysine triisothiocyanate, xylylene diisothiocyanate, bis(isothiocyanatoethyl)benzene, bis(isothiocyanatopropyl)benzene, α,α,α',α'-tetramethylxylylene diisothiocyanate, bis(isothiocyanatobutyl)benzene, bis(isothiocyanatomethyl)naphthalene, bis(isothiocyanatomethyl)diphenyl ether, bis(isothiocyanatoethyl)phthalate, mesitylylene triisothiocyanate, 2,6-di(isothiocyanatomethyl)furan and the like; alicyclic polyisothiocyanate compounds such as isophorone diisothiocyanate, bis(isothiocyanatomethyl)cyclohexane, dicyclohexylmethane diisothiocyanate, cyclohexane diisothiocyanate, methylcyclohexane diisothiocyanate, dicyclohexyldimethylmethane isothiocyanate, 2,2-dimethyldicyclohexylmethane isothiocyanate, 2,5-bis(isothiocyanatomethyl)bicyclo-[2,2,1]-heptane, 2,6-bis(isothiocyanatomethyl)bicyclo-[2,2,1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, 4,9-bis(isothiocyanatomethyl)tricyclodecane and the like; aromatic polyisothiocyanate compounds such as phenylene diisothiocyanate, tolylene diisothiocyanate, ethylphenylene diisothiocyanate, isopropylphenylene diisothiocyanate, dimethylphenylene diisothiocyanate, diethylphenylene diisothiocyanate, diisothiopropylphenylene diisothiocyanate, trimethylbenzene triisothiocyanate, benzene triisothiocyanate, biphenyl diisothiocyanate, toluidine diisothiocyanate, 4,4-diphenylmethane diisothiocyanate, 3,3-dimethyldiphenylmethane-4,4-diisothiocyanate, bibenzyl-4,4-diisothiocyanate, bis(isothiocyanatophenyl)ethylene, 3,3-dimethoxybiphenyl-4,4-diisothiocyanate, phenylisothiocyanatoethyl isothiocyanate, hexahydrobenzene diisothiocyanate, hexahydrodiphenylmethane-4,4-diisothiocyanate and the like; sulfur-containing aliphatic polyisothiocyanate compounds such as bis(isothiocyanatoethyl)sulfide, bis(isothiocyanatopropyl)sulfide, bis(isothiocyanatohexyl)sulfide, bis(isothiocyanatomethyl)sulfone, bis(isothiocyanatomethyl)disulfide, bis(isothiocyanatopropyl)disulfide, bis(isothiocyanatomethylthio)methane, bis(isothiocyanatoethylthio)methane, bis(isothiocyanatoethylthio)ethane, bis(isothiocyanatomethylthio)ethane, 1,5-diisothiocyanato-2-isothiocyanatomethyl-3-thiapentane and the like; sulfur-containing aromatic polyisothiocyanate compounds such as diphenyl sulfide-2,4-diisothiocyanate, diphenyl sulfide-4,4-diisothiocyanate, 3,3-dimethoxy-4,4-diisothiocyanatodibenzylthioether, bis(4-isothiocyanatomethylbenzene)sulfide, 4,4-methoxybenzenethioethylene glycol-3,3-diisothiocyanate, diphenyl disulfide-4,4-diisothiocyanate, 2,2-dimethyldiphenyl disulfide-5,5-diisothiocyanate, 3,3-dimethyldiphenyl disulfide-5,5-diisothiocyanate, 3,3-dimethyldiphenyl disulfide-6,6-diisothiocyanate, 4,4-dimethyldiphenyl disulfide-5,5-diisothiocyanate, 3,3-dimethoxydiphenyl disulfide-4,4-diisothiocyanate, 4,4-dimethoxydiphenyl disulfide-3,3-diisothiocyanate and the like; sulfur-containing heterocyclic polyisothiocyanate compounds such as 2,5-diisothiocyanatothiophene, 2,5-bis(isothiocyanatomethyl)thiophene, 2,5-diisothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato- 1,3-dithiolane, 4,5-bis(isothiocyanatomethyl)-1,3-dithiolane, 4,5-bis(isothiocyanatomethyl)-2-methyl-1,3-dithiolane and the like. However, the present invention is not limited to these exemplified compounds.

Their halogen substituted compounds such as chlorine substituted compounds, bromine substituted compounds and the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products, and the like may be employed. These isothiocyanate compounds may be used singly, or two or more kinds thereof may be used in combination.

Examples of the isothiocyanate compound having an isocyanate group which is used as a raw material in the present invention include aliphatic or alicyclic compounds such as 1-isocyanato-3-isothiocyanatopropane, 1-isocyanato-5-isothiocyanatopentane, 1-isocyanato-6-isothiocyanatohexane, isocyanatocarbonyl isothiocyanate, 1-isocyanato-4-isothiocyanatocyclohexane and the like; aromatic compounds such as 1-isocyanato-4-isothiocyanatobenzene, 4-methyl-3-isocyanato-1-isothiocyanatobenzene, and the like; heterocyclic compounds such as 2-isocyanato-4,5-di-isothiocyanato-1,3,5-triazine and the like; and isothiocyanate groups such as 4-isocyanato-4'-isothiocyanatodiphenyl sulfide, 2-isocyanato-2'-isothiocyanatodiethyl disulfide and the like, and their sulfur substituted compounds.

Furthermore, their halogen substituted compounds such as chlorine substituted compounds, bromine substituted compounds and the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products, and the like may be employed.

In the present invention, from the viewpoints of improvement of a refractive index and improvement of heat resistance, it is preferable that a resin having a thiourethane bond has an aromatic group, a heterocyclic group or an alicyclic group in the structure. Namely, it is preferable to use a compound having an aromatic group, a heterocyclic group or an alicyclic group as isocyanates.

These isocyanates may be used singly, or two or more kinds thereof may be used in combination. As isocyanates, more preferably used are phenylene diisocyanate, m-xylylene diisocyanate, 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, hexamethylene diisocyanate, tolylene diisocyanate and 4,4-diphenylmethane diisocyanate, while particularly preferably used are phenylene diisocyanate, m-xylylene diisocyanate, tolylene diisocyanate, 4,4-diphenylmethane diisocyanate, 2,5-bis(isocyanatomethyl)-bicyclo[2.2.1]heptane and 2,6-bis(isocyanatomethyl)-bicyclo[2.2.1]heptane.

In the present invention, from the viewpoint of improvement of a refractive index, it is preferable that a resin having a thiourethane bond has an aromatic group, a heterocyclic group or an alicyclic group in the structure. Namely, it is preferable to use a compound having an aromatic group, a heterocyclic group or an alicyclic group as isocyanates.

In the present invention, among the aforementioned isocyanates, with the use of isocyanates having an aromatic ring, a resin having a high refractive index is obtained.

An active hydrogen compound having a mercapto group which is used as a raw material of the resin having a thiourethane bond is selected from a mercapto compound and a mercapto compound having a hydroxy group.

Examples of the mercapto compound used in the present invention include aliphatic polythiol compounds such as methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, 1,2-dimercaptopropylmethyl ether, 2,3-dimercaptopropylmethyl ether, 2,2-bis(mercaptomethyl)-1,3-propanedithiol, bis(2-mercaptoethyl)ether, tetrakis(mercaptomethyl)methane and the like; aliphatic polythiol compounds containing an ester bond such as 2,3-dimercaptosuccinic acid(2-mercaptoethylester), thiomalic acid bis(2-mercaptoethylester), 2,3-dimercapto-1-propanol(2-mercaptoacetate), 2,3-dimercapto-1-propanol(3-mercaptopropionate), 3-mercapto-1,2-propanediol bis(2-mercaptoacetate), 3-mercapto-1,2-propanediol bis(3-mercaptopropionate), diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerine tris(2-mercaptoacetate), glycerine tris(3-mercaptopropionate), 1,4-cyclohexanediol bis(2-mercaptoacetate), 1,4-cyclohexanediol bis(3-mercaptopropionate) and the like; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis (mercaptoethyl)benzene, 1,2,3,5-tetrakis(mercaptoethyl) benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-dichlorobenzene-1,3-dithiol, 1,3-di(p-chlorophenyl)propane-2,2-dithiol, 3,4,5-tribromo-1,2-dimercaptobenzene, 2,3,4,6-tetrachloro-1,5-bis(mercaptomethyl)benzene and the like; heterocyclic thiol compounds such as 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-sym-triazine and the like; and their halogen substituted compounds. However, the present invention is not limited to these exemplified compounds.

Furthermore, their halogen substituted compounds such as chlorine substituted compounds, bromine substituted compounds and the like may be employed. These mercapto compounds may be used singly, or two or more kinds thereof may be used in combination.

Examples of the mercapto compound having one or more sulfide bonds in one molecule include aliphatic polythiol compounds such as bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, 2,5-dimercaptomethyl-2,5-dimethyl-1,4-dithiane and the like; aliphatic polythiol compounds containing an ester bond such as esters of thioglycolic acid and mercaptopropionic acid with these compounds, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(3-mercaptopropionate), thiodiglycolic acid bis(2-mercaptoethylester), thiodipropionic acid bis(2-mercaptoethylester), 4,4-thiodibutyric acid bis(2-mercaptoethylester), dithiodiglycolic acid bis(2-mercaptoethylester), dithiodipropionic acid bis(2-mercaptoethylester), 4,4-dithiodibutyric acid bis(2-mercaptoethylester), thiodiglycolic acid bis(2,3-dimercaptopropylester), thiodipropionic acid bis(2,3-dimercaptopropylester), dithiodiglycolic acid bis(2,3-dimercaptopropylester), thiodipropionic acid bis(2,3-dimercaptopropylester), dithiodipropionic acid bis(2,3-dimercaptopropylester) and the like; heterocyclic polythiol compounds such as 3,4-thiophenedithiol, bismuthiol and the like; polythiol compounds having a dithioacetal or dithioketal skeleton such as 1,1,3,3-tetrakis(mercaptomethylthio)propane, 1,1,2,2-tetrakis(mercaptomethylthio)ethane, 4,6-bis(mercaptomethylthio)-1,3-dithiane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio)ethanethiol, 2-(4,5-dimercapto-2-thiapentyl)-1,3-dithiacyclopentane, 2,5-bis(4,4-bis(mercaptomethylthio)-2-thiabutyl)-1,4-dithiane, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 3-mercaptomethylthio-1,6-dimercapto-2,5-dithiahexane, 2-(2,2-bis(mercaptodimethylthio)ethyl)-1,3-dithiethane, 1,1,9,9-tetrakis(mercaptomethylthio)-5-(3,3-bis(mercaptomethylthio)-1-thiapropyl)3,7-dithianonane, tris(2,2-bis(mercaptomethylthio)ethyl)methane, tris(4,4-bis(mercaptomethylthio)-2-thiabutyl)methane, tetrakis(2,2-bis(mercaptomethylthio)ethyl)methane, tetrakis(4,4-bis(mercaptomethylthio)-2-thiabutyl)methane, 3,5,9,11-tetrakis(mercaptomethylthio)-1,13-dimercapto-2,6,8,12-tetrathiatridecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercaptomethylthio)-1,17-dimercapto-2,6,8,10,12,16-hexathiaheptadecane, 3,4,8,9-tetrakis(mercaptomethylthio)-1,11-dimercapto-2,5,7,10-tetrathiaundecane, 3,4,8,9,13,14-hexakis(mercaptomethylthio)-1,16-dimercapto-2,5,7,10,12,15-hexathiahexadecane, 8-[bis(mercaptomethylthio)methyl]-3,4,12,13-tetrakis(mercaptomethylthio)-1,15-dimercapto-2,5,7,9,11,14-hexathiapentadecane, 4,6-bis[3,5-bis(mercaptomethylthio)-7-mercapto-2,6-dithiaheptylthio]-1,3-dithiane, 4-[3,5-bis(mercaptomethylthio)-7-mercapto-2,6-dithiaheptylthio]-6-mercaptomethylthio-1,3-dithiane, 1,1-bis[4-(6-mercaptomethylthio)-1,3-dithianylthio]-1,3-bis(mercaptomethylthio)propane, 1-[4-(6-mercaptomethylthio)-1,3-dithianylthio]-3-[2,2-bis(mercaptomethylthio)ethyl]-7,9-bis(mercaptomethylthio)-2,4,6,10-tetrathiaundecane, 1,5-bis[4-(6-mercaptomethylthio)-1,3-dithianylthio]-3-[2-(1,3-dithietanyl)]methyl-2,4-dithiapentane, 4,6-bis{3-[2-(1,3-dithietanyl)]methyl-5-mercapto-2,4-dithiapentylthio}-1,3-dithiane, 4,6-bis[4-(6-mercaptomethylthio)-1,3-dithianylthio]-6-[4-(6-mercaptomethylthio)-1,3-dithianylthio]-1,3-dithiane, 3-[2-(1,3-dithietanyl)]methyl-7,9-bis(mercaptomethylthio)-1,11-dimercapto-2,4,6,10-tetrathiaundecane, 9-[2-(1,3-dithietanyl)]methyl-3,5,13,15-tetrakis(mercaptomethylthio)-1,17-dimercapto-2,6,8,10,12,16-hexathiaheptadecane, 3-[2-(1,3-dithietanyl)]methyl-7,9,13,15-tetrakis(mercaptomethylthio)-1,17-dimercapto-2,4,6,10,12,16-hexathiaheptadecane, 3,7-bis[2-(1,3-dithietanyl)]methyl-1,9-dimercapto-2,4,6,8-tetrathianonane, 4-[3,4,8,9-tetrakis(mercaptomethylthio)-11-mercapto-2,5,7,10-tetrathiaundecyl]-5-mercaptomethylthio-1,3-dithiolane, 4,5-bis[3,4-bis(mercaptomethylthio)-6-mercapto-2,5-dithiahexylthio]-1,3-dithiolane, 4-[3,4-bis(mercaptomethylthio)-6-mercapto-2,5-dithiahexylthio]-5-mercaptomethylthio-1,3-dithiolane, 4-[3-bis (mercaptomethylthio)methyl-5,6-bis(mercaptomethylthio)-8-mercapto-2,4,7-trithiaoctyl]-5-mercaptomethylthio-1,3-dithiolane, 2-{bis[3,4-bis(mercaptomethylthio)-6-mercapto-2,5-dithiahexylthio]methyl}-1,3-dithiethane, 2-[3,4-bis(mercaptomethylthio)-6-mercapto-2,5-dithiahexylthio]mercaptomethylthiomethyl-1,3-dithiethane, 2-[3,4,8,9-tetrakis(mercaptomethylthio)-11-mercapto-2,5,7,10-tetrathiaundecylthio]mercaptomethylthiomethyl-1,3-dithiethane, 2-[3-bis(mercaptomethylthio)methyl-5,6-bis(mercaptomethylthio)-8-mercapto-2,4,7-trithiaoctyl]mercaptomethylthiomethyl-1,3-dithiethane, 4,5-bis{1-[2-(1,3-dithietanyl)]-3-mercapto-2-thiapropylthio}-1,3-dithiolane, 4-{1-[2-(1,3-dithietanyl)]-3-mercapto-2-thiapropylthio}-5-[1,2-bis(mercaptomethylthio)-4-mercapto-3-thiabutylthio]-1,3-dithiolane, 2-{bis[4-(5-mercaptomethylthio-1,3-dithioranyl)thio]methyl}-1,3-dithiethane, 4-[4-(5-mercaptomethylthio-1,3-dithioranyl)thio]-5-{1-[2-(1,3-dithietanyl)]-3-mercapto-2-thiapropylthio}-1,3-dithiolane, their oligomers, and the like; and polythiol compounds having an orthotrithioformic acid ester skeleton such as tris(mercaptomethylthio)methane, tris(mercaptoethylthio)methane, 1,1,5,5-tetrakis(mercaptomethylthio)-2,4-dithiapentane, bis[4,4-bis(mercaptomethylthio)-1,3-dithiabutyl]-(mercaptomethylthio)methane, tris[4,4-bis(mercaptomethylthio)-1,3-dithiabutyl]methane, 2,4,6-tris(mercaptomethylthio)-1,3,5-trithiacyclohexane, 2,4-bis(mercaptomethylthio)-1,3,5-trithiacyclohexane, 1,1,3,3-tetrakis(mercaptomethylthio)-2-thiapropane, bis(mercaptomethyl)methylthio-1,3,5-trithiacyclohexane, tris[(4-mercaptomethyl-2,5-dithiacyclohexyl-1-yl)methylthio]methane, 2,4-bis(mercaptomethylthio)-1,3-dithiacyclopentane, 2-mercaptoethylthio-4-mercaptomethyl-1,3-dithiacyclopentane, 2-(2,3-dimercaptopropylthio)-1,3-dithiacyclopentane, 4-mercaptomethyl-2-(2,3-dimercaptopropylthio)-1,3-dithiacyclopentane, 4-mercaptomethyl-2-(1,3-dimercapto-2-propylthio)-1,3-dithiacyclopentane, tris[2,2-bis(mercaptomethylthio)-2-thiapropyl]methane, tris[4,4-bis(mercaptomethylthio)-3-thiabutyl]methane, 2,4,6-tris[3,3-bis(mercaptomethylthio)-2-thiapropyl]-1,3,5-trithiacyclohexane, tetrakis[3,3-bis(mercaptomethylthio)-2-thiapropyl]methane, their oligomers, and the like. However, the present invention is not limited to these exemplified compounds. Furthermore, their halogen substituted compounds such as chlorine substituted compounds, bromine substituted compounds and the like may be employed. These mercapto compounds having a sulfide bond may be used singly, or two or more kinds thereof may be used in combination.

Furthermore, examples of the mercapto compound having a hydroxy group include 2-mercaptoethanol, 3-mercapto-1,2-propanediol, glycerine di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl)methane, 1-hydroxyethylthio-3-mercaptoethylthiobenzene, 4-hydroxy-4'-mercaptodiphenylsulfone, 2-(2-mercaptoethylthio)ethanol, dihydroxyethyl sulfide mono(3-mercaptopropionate), dimercaptoethane mono(salicylate), hydroxyethylthiomethyl-tris(mercaptoethylthio)methane and the like. However, the present invention is not limited to these exemplified compounds. Furthermore, their halogen substituted compounds such as chlorine substituted compounds, bromine substituted compounds and the like may be employed. These mercapto compounds having a hydroxy group may be used singly, or two or more kinds thereof may be used in combination.

These active hydrogen compounds may be used singly, or two or more kinds thereof may be used in combination. As the active hydrogen compound, preferably used are 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane and 2-(2,2-bis(mercaptodimethylthio)ethyl)-1,3-dithiethane, while further preferably are 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane and pentaerythritol tetrakis(3-mercaptopropionate).

In the present invention, it is preferable that the active hydrogen compounds contain at least one kind of compound having three or more mercapto groups which is selected from the above compounds, and it is more preferable that all compounds have three or more mercapto groups. The refractive index of the thus obtained resin is improved, the birefringence is also reduced because optical anisotropy is hardly caused, and mechanical properties such as impact resistance and the like are improved.

On the other hand, according to Japanese Laid-open Patent Publication No. 2005-336476, only a compound having two mercapto groups is used, which is different from the present invention employing at least one compound having three or more mercapto groups. There are many rooms for improvement in optical properties such as refractive index and the like, and mechanical properties such as impact resistance and the like of the obtained resin.

The resin having a thiourethane bond is mainly composed of one or more kinds of isocyanates selected from the group consisting of an isocyanate compound and an isothiocyanate compound, and one or more kinds of active hydrogen compounds having a mercapto group. However, for the purpose of modifying the polythiourethane resin, a resin modifier such as a hydroxy compound, an amine compound, an epoxy compound, an episulfide compound, an organic acid and its anhydride, an olefin compound containing a (meth)acrylate compound or the like may be added. Herein, the resin modifier is a compound which adjusts or improves physical properties such as refractive index, Abbe's number, heat resistance, specific gravity and the like, and mechanical strength such as impact resistance of a polythiourethane resin.

Examples of the hydroxy compound which may be added as the resin modifier include diethylene glycol, triethylene glycol, 1,3-propanediol, dipropylene glycol, tripropylene glycol, 1,4-butanediol, 1,3-butanediol, 1,5-pentanediol, 1,4-pentanediol, 1,3-pentanediol, 1,6-hexanediol, 1,5-hexanediol, 1,4-hexanediol, 1,3-hexanediol, 1,7-heptanediol, 1,8-octanediol, thiodiethanol, dithiodiethanol, thiodipropanol, dithiodipropanol, their oligomers, and the like. However, the present invention is not limited to these exemplified compounds. These alcohol compounds may be used singly, or two or more kinds thereof may be used in combination.

Examples of the amine compound which may be added as the resin modifier include monofunctional primary amine compounds such as ethylamine, n-propylamine, isopropylamine, n-butylamine, sec-butylamine, tert-butylamine, pentylamine, hexylamine, heptylamine, octylamine, decylamine, laurylamine, myristylamine, 3-pentylamine, 2-ethylhexylamine, 1,2-dimethylhexylamine, allylamine, aminomethylbicycloheptane, cyclopentylamine, cyclohexylamine, 2,3-dimethylcyclohexylamine, aminomethylcyclohexane, aniline, benzylamine, phenethylamine, 2,3-, or 4-methylbenzylamine, o-, m-, or p-methylaniline, o-, m-, or p-ethylaniline, aminomorpholine, naphthylamine, furfurylamine, α-aminodiphenylmethane, toluidine, aminopyridine, aminophenol, aminoethanol, 1-aminopropanol, 2-aminopropanol, aminobutanol, aminopentanol, aminohexanol, methoxyethylamine, 2-(2-aminoethoxy)ethanol, 3-ethoxypropylamine, 3-propoxypropylamine, 3-butoxypropylamine, 3-isopropoxypropylamine, 3-isobutoxypropylamine, 2,2-diethoxyethylamine and the like; primary polyamine compounds such as ethylenediamine, 1,2-, or 1,3-diaminopropane, 1,2-, 1,3-, or 1,4-diaminobutane, 1,5-diaminopentane, 1,6-diaminohexane, 1,7-diaminoheptane, 1,8-diaminooctane, 1,10-diaminodecane, 1,2-, 1,3-, or 1,4-diaminocyclohexane, o-, m-, or p-diaminobenzene, 3,4-, or 4,4'-diaminobenzophenone, 3,4-, or 4,4'-diaminodiphenyl ether, 4,4'-diaminodiphenylmethane, 4,4'-diaminodiphenyl sulfide, 3,3'-, or 4,4'-diaminodiphenylsulfone, 2,7-diaminofluorene, 1,5-, 1,8-, or 2,3-diaminonaphthalene, 2,3-, 2,6-, or 3,4-diaminopyridine, 2,4-, or 2,6-diaminotoluene, m-, or p-xylylenediamine, isophoronediamine, diaminomethylbicycloheptane, 1,3-, or 1,4-diaminomethylcyclohexane, 2-, or 4-aminopiperidine, 2-, or 4-aminomethylpiperidine, 2-, or 4-aminoethylpiperidine, N-aminoethylmorpholine, N-aminopropylmorpholine and the like; monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, morpholine and the like; and secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, tetramethylguanidine and the like. However, the present invention is not limited to these exemplified compounds. These amine compounds may be used singly, or two or more kinds thereof may be used in combination.

Examples of the epoxy resin which may be added as the resin modifier include a phenol type epoxy compound obtained by the condensation reaction of a polyhydric phenol compound such as bisphenol A glycidyl ether with an epihalohydrin compound, an alcohol type epoxy compound obtained by condensation of a polyhydric alcohol compound such as hydrogenated bisphenol A glycidyl ether with an epihalohydrin compound, a glycidyl ester type epoxy compound obtained by condensation of a multivalent organic acid compound such as 3,4-epoxycyclohexylmethyl-3',4'-epoxycyclohexane carboxylate or 1,2-hexahydrophthalic acid diglycidyl ester with an epihalohydrin compound, an amine type epoxy compound obtained by condensation of a primary or secondary diamine compound with an epihalohydrin compound, and an aliphatic multivalent epoxy compound such as vinylcyclohexene diepoxide, and the like. However, the present invention is not limited to these exemplified compounds. These epoxy compounds may be used singly, or two or more kinds thereof may be used in combination.

Examples of the episulfide compound which may be added as the resin modifier include chain aliphatic 2,3-epithiopropylthio compounds such as bis(2,3-epithiopropylthio) sulfide, bis(2,3-epithiopropylthio)disulfide, bis(2,3-epithiopropylthio)methane, 1,2-bis(2,3-epithiopropylthio)ethane, 1,5-bis(2,3-epithiopropylthio)-3-thiapentane and the like; 2,3-epithiopropylthio compounds having an alicyclic or heterocyclic ring such as 1,3-bis(2,3-epithiopropylthio)cyclohexane, 2,5-bis(2,3-epithiopropylthiomethyl)-1,4-dithiane and the like; and aromatic 2,3-epithiopropylthio compounds such as 1,3-bis(2,3-epithiopropylthio)benzene, 1,4-bis(2,3-epithiopropylthio)benzene and the like. However, the present invention is not limited to these exemplified compounds. These episulfide compounds may be used singly, or two or more kinds thereof may be used in combination.

Examples of the organic acid and its anhydride which may be added as the resin modifier include thiodiglycolic acid, thiodipropionic acid, dithiodipropionic acid, phthalic anhydride, hexahydrophthalic anhydride, methylhexahydrophthalic anhydride, methyltetrahydrophthalic anhydride, methylnorbornene anhydride, methylnorbornene anhydride, maleic anhydride, trimellitic anhydride, pyromellitic anhydride and the like. However, the present invention is not limited to these exemplified compounds. These organic acids and anhydrides thereof may be used singly, or two or more kinds thereof may be used in combination.

Examples of the olefin compound which may be added as the resin modifier include (meth)acrylate compounds such as benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentylglycol diacrylate, neopentylglycol dimethacrylate, ethylene glycol bisglycidyl acrylate, ethylene glycol bisglycidyl methacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, dimethyloltricyclodecane diacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methylthioacrylate, methylthiomethacrylate, phenylthioacrylate, benzylthiomethacrylate, xylylenedithiol diacrylate, xylylenedithiol dimethacrylate, mercaptoethyl sulfide diacrylate, mercaptoethyl sulfide dimethacrylate and the like; allyl compounds such as allyl glycidyl ether, diallyl phthalate, diallyl terephthalate, diallyl isophthalate, diallyl carbonate, diethylene glycol bisallylcarbonate and the like; and vinyl compounds such as styrene, chlorostyrene, methylstyrene, bromostyrene, dibromostyrene, divinylbenzene, 3,9-divinylspirobi (m-dioxane) and the like. However, the present invention is not limited to these exemplified compounds. These olefin compounds may be used singly, or two or more kinds thereof may be used in combination.

Next, a method for preparing a resin having a thiourethane bond will be described.

In the present invention, the proportion of isocyanates used as a raw material, the active hydrogen compound and the hydroxy compound as the resin modifier in terms of the molar ratio of functional groups (NCO+NCS)/(SH+OH) is usually in the range of 0.5 to 3.0, preferably in the range of 0.6 to 2.0, and further preferably in the range of 0.8 to 1.3.

At the time of molding the film of the resin having a thiourethane bond, a variety of substances may be added in the same manner as in a known molding method depending on the purposes. Examples of the substance include a catalyst such as dibutyltin dichloride, dimethyltin dichloride or the like, an ultraviolet absorber such as a benzotriazole ultraviolet absorber or the like, an external or internal mold release agent, a light stabilizer, a chain extender, a cross-linking agent, an anti-oxidant, an anti-coloring agent, an anti-oxidant, a reaction initiator such as a radical reaction initiator or the like, a chain extender, a cross-linking agent, an anti-coloring agent, an oil-soluble dye, a filler, an adhesion improving agent and the like. These additives may be added to the polymerizable composition in advance.

In case of the resin having a thiourethane bond, an inorganic compound having a sulfur atom or a selenium atom easily causes remarkable deterioration of color or turbidity, so that the content of these inorganic compounds in the polymerizable composition is preferably equal to or less than 1 weight %.

Next, a method for preparing the monomer will be described. In the present invention, when isocyanates, the active hydrogen compound, a reaction catalyst, a mold release agent and other additives are mixed before the polymerization to prepare a polymerizable composition, the order of addition of the catalyst, the mold release agent and other additives will vary depending on their solubility into the monomers. However, they may be added to isocyanates and dissolved therein in advance, added to the active hydrogen compounds and dissolved therein in advance, or added to a mixture of isocyanates and the active hydrogen compounds and dissolved therein. Alternatively, the catalyst, the mold release agent and other additives may be dissolved in a part of the monomers in use to prepare a master solution, and then the master solution may be added to the monomer mixture. The order of addition is not restricted to these exemplified methods, and is properly selected on the basis of operability, safety, expediency and the like.

To add the catalyst, the catalyst may be added as it is, or the catalyst may be dissolved in apart of the monomers in use to prepare a master solution, and then the master solution may be added to the monomer mixture.

When the isocyanates, the active hydrogen compound and the reaction catalyst, the mold release agent and other additives are mixed to prepare a polymerizable composition, the temperature at this time is usually equal to or less than 25 degrees centigrade. From the viewpoint of pot life of the composition, it is sometimes preferable to employ a lower temperature than 25 degrees centigrade. However, when the solubility of the reaction catalyst, the mold release agent and the additives into the monomers is insufficient, it is also possible to heat them in advance and then to dissolve them in the isocyanates or the active hydrogen compounds that are the monomers, or a monomer mixture.

Method for Producing Film

The film of the present invention can be produced by a usual method, and can be obtained by the use of the aforementioned polymerizable composition according to a casting (thin film coating-polymerization curing) method, a spin coating-polymerization curing method, a cast molding polymerization method or the like.

The casting method or the spin coating-polymerization curing method refers to a method involving extruding a viscosity-adjusted polymerizable composition which is a mixture of a compound having an isocyanate group and a compound having a thiol group, which is capable of forming a thiourethane, from a cast coating equipment and casting it on a base material, or rotating a base material with the composition placed thereon at a high speed to form a thin film, and then polymerizing and curing it to obtain a film containing partially a thiourethane bond. Incidentally, the viscosity at the time of casting (coating) of the mixture is properly selected by the coating method and uses thereof.

The cast molding polymerization method refers to a method involving injecting a polymerizable composition which is a mixture of a compound having an isocyanate group and a compound having a thiol group containing partially a thiourethane bond and further capable of forming thiourethane between surfaces of a mold having a space of equal to or less than 200 μm composed of a pair of inorganic glasses, metals or resin plates with four sealed sides, and polymerizing it to obtain a film. Incidentally, the viscosity at the time of injecting the mixture is properly selected by the injection method, curing process and the like.

Incidentally, in the present invention, the resulting film may be subjected to annealing. Also, the polymerizable composition may be mixed with fine particles of a metal oxide, a filler or the like to form a film.

Uses of Film

The film of the present invention is excellent in a balance among high refractive index, low birefringence and light transmittance, and further excellent in a balance of mechanical characteristics such as toughness, hardness, dimensional stability and the like, so that effects of deformation and the like during processing are very small, while the film is further excellent in solvent resistance as well, so that the film can be used as various optical films.

Examples of the optical film include a polarizing film, a polarizing element and a polarizing plate protective film constituting the polarizing film, a phase difference film, an alignment film, a viewing angle improving (compensation) film, a diffused plate (film), a prism sheet, a light-guiding plate, a luminance improving film, a near-infrared absorption film, a reflection film, an anti-reflection (AR) film, a low reflection (LR) film, an anti-glare (AG) film, a transparent conductive (ITO) film, a base material for transparent conductive films, an anisotropic conductive film (ACF), an electromagnetic wave shielding (EMI) film, a film for electrode substrates, a film for color filter substrates, a barrier film, a color filter layer, a black matrix layer and the like. The optical film of the present invention may be formed inside or outside of various optical members of a liquid crystal display, an organic EL display, a plasma display, a solar cell and the like. The present invention provides such an optical member.

Meanwhile, the optical film of the present invention is particularly positioned on a surface of a light emitting surface or a light capturing surface, whereby light can be taken out or captured with good efficiency and the optical film is most suitably used for applications that require these actions. For example, one surface of the film is processed into a concavo-convex pattern and the other surface is attached to the light emitting surface of a light emitting device, whereby it is possible to provide a light emitting device having improved luminous efficiency by taking out light that is reflected inside a luminous body to the outside. Furthermore, this film itself is used as a substrate and a light emitting element is directly formed on a surface of the film, whereby it is possible to provide a light emitting device having improved luminous efficiency by reducing reflection inside the element. According to the present invention, it is also possible to provide a light emitting device in which the optical film is formed inside or outside thereof, and further a lighting device using the light emitting device (a LED lamp, a back light of a display, and a flashlight of a camera or a cellular phone or the like) and an image display device using the light emitting device (a flat panel display or the like).

The optical film of the present invention may be composed of one film having two or more functions of such an optical film, or may constitute a part or the whole of a film (a composite film) having two or more of such optical films. These optical films formed on a base material such as glass, other resin films or the like are used without peeling off, whereby it is also possible to provide a laminated member, and a multi-layer structure.

EXAMPLES

Hereinafter, the present invention will be illustrated in more detail with reference to Examples. However, the present invention is not restricted to these Examples.

Performances of the films obtained in Examples were evaluated according to the following test methods.

Refractive Index and Abbe's Number: These were measured at 20 degrees centigrade using a multiwavelength Abbe refractometer manufactured by Atago Co., Ltd. (sodium D line: 589 nm).

Birefringence: The in-plane retardation Re and the in-plane birefringence $\Delta n_{xy}$ were measured at a wavelength 590 nm using KOBRA-CCD/X manufactured by Oji Scientific Instruments. The measurement of the retardation in the thickness direction, Rth and the birefringence in the thickness direction, $\Delta n_{xz}$ was conducted in the wavelength range from 400 to 800 nm using a retardation measuring apparatus, RETS-100, a product of Otsuka Electronics Co., Ltd. according to a rotation analyzer method (Rth and $\Delta n$ in the Table were values at 590 nm).

Coefficient of Linear Expansion: It was measured at a temperature elevation rate of 5 degrees centigrade/min using a test piece processed into a shape having a length of 15 mm and a width of 5 mm with a thermomechanical analyzer (TMA-50, a product of Shimadzu Corporation). Furthermore, a TMA softening temperature was obtained from the intersection of the tangents of the TMA curves before and after the glass transition temperature.

Mechanical Strength: A dumbbell test specimen processed into a shape having a length of 50 mm and a width of 5 mm was pulled from both ends of the test specimen at a tensile speed of 30 mm/min (thickness: 80 to 100 μm) using a universal testing machine (201-5 model, a product of Intesco Co., Ltd.).

Impact Strength: It was measured using a pendulum hammer having a tip diameter of 1 inch with a film impact tester (a product of Toyo Seiki Seisaku-sho, Ltd.).

Total Light Transmittance (Transmittance-1): It was measured in accordance with JIS-K7105 using a haze meter (NDH2000, a product of Nippon Denshoku Industries Co., Ltd.).

550 nm Transmittance (Transmittance-2): The transmittance was measured at a wavelength 550 nm using a spectrophotometer (U-3010, a product of Hitachi, Ltd.).

Water Vapor Transmission: The amount of water vapor transmission was measured in accordance with JIS Z0208 under the conditions of a temperature of 60 degrees centigrade, a humidity of 90% RH and a film thickness of 100 μm.

Solvent Resistance: Respective solvents (acetone, ethanol, cyclohexanone and toluene) were respectively added dropwise on the film, and then the film was rubbed with a bemcot to visually observe the dissolved state on the surface.

Production Example 1

A polythiol compound (B-2) containing 5,7-dimercaptomethyl-1,11-dimercapto-3,6-trithiaundecane, 4,7-dimercaptomethyl-1,11-dimercapto-3,6-trithiaundecane and 4,8-dimercaptomethyl-1,11-dimercapto-3,6-trithiaundecane was synthesized in accordance with the method described in Example 1 of Japanese Laid-open Patent Publication No. 1995-252207.

Production Example 2

A polythiol compound (B-3) containing 1,1,3,3-tetrakis (mercaptomethylthio)propane, 4,6-bis(mercaptomethylthio)-1,3-dithiane and 2-(2,2-bis(mercaptomethylthio) ethyl)-1,3-dithiethane was synthesized in accordance with the method described in Production Example 2 of Japanese Laid-open Patent Publication No. 2004-2820.

Example 1

10.5 mg of dibutyltin dichloride as a catalyst and 70 mg of Zelec UN (product name, acid phosphoric acid alkyl ester, a product of Stepan Company) as an internal release agent were added to 36.4 g of m-xylylene diisocyanate in advance, and the contents were dissolved to give a monomer mixed solution. Next, 33.6 g of 4-mercaptomethyl-1,8-dimercapto-3,6-dithiaoctane was added thereto, and the contents were well mixed to give a monomer mixed solution. The monomer mixed solution was degassed under reduced pressure for 1 hour. A Kapton tape of 80 μm was affixed to four sides of a blue plate glass in a frame shape to build a wall, the monomer mixed solution was added dropwise to the inside of the wall, and a plate glass of the same size was further placed from the top. It was confirmed that the inside of the Kapton tape wall was filled with the monomer mixed solution, and then two plates of glasses with the solution sandwiched between them were fixed with a clip. The resulting material was subjected to a temperature elevation from 20 to 120 degrees centigrade slowly and cured over 20 hours. After cooling, a film was obtained by peeling it off from the glass. The resulting film was colorless and transparent.

Example 2

10.5 mg of dibutyltin dichloride as a catalyst and 70 mg of Zelec UN (product name, acid phosphoric acid alkyl ester, a product of Stepan Company) as an internal release agent were added to 36.4 g of m-xylylene diisocyanate in advance, and the contents were dissolved to give a monomer mixed solution. Next, 33.6 g of 4-mercaptomethyl-1,8-dimercapto-3,6-dithiaoctane was added thereto, and the contents were well mixed to give a monomer mixed solution. The monomer mixed solution was degassed under reduced pressure for 1 hour, and then applied to a polyethylene naphthalate film (Teonex Q51, a product of Teijin Ltd.) using an applicator (a product of Coating Tester Industries Co., Ltd.) with a coating gap set at 70 μm. The monomer mixed solution was uniformly wet spread on the base material. The resulting material was subjected to a temperature elevation from 20 to 120 degrees centigrade slowly and cured over 13 hours. After cooling, a film was obtained by peeling off the base material. The resulting film was colorless and transparent. Respective physical properties of the film were as follows:
Refractive Index: 1.66 (sodium D line: 589 nm)
Abbe's Number: 32
Transmittance (average transmittance at a wavelength 400 to 800 nm): 88.7% (film thickness: 80 μm)
Incidentally, it was 88.0% (film thickness: 80 μm) at a wavelength 430 nm.
Birefringence: In-plane Retardation Re (wavelength: 590 nm): 0.8 nm (film thickness: 80 μm)
Birefringence $\Delta n_{xy}$ (wavelength: 590 nm): $1.0 \times 10^{-5}$
Retardation in the thickness direction, Rth (wavelength: 590 nm): 49 nm
Birefringence $\Delta n_{xz}$ (wavelength: 590 nm): $6.3 \times 10^{-4}$
Water Vapor Transmission Rate: 7 g/m$^2$·24 hr (film thickness: 100 μm conversion)
Solvent Resistance: Dissolution with respect to any of solvents such as acetone, ethanol, cyclohexanone and toluene was not recognized.
Coefficient of Linear Expansion: $8 \times 10^{-5}$/K (thickness: 80 μm)
Mechanical strength:
Tensile Modulus: 3.8 to 4.1 GPa
Breaking stress: 120 MPa
Breaking elongation: 3.1 to 5.7%
Impact Strength: 2 to 4 kJ/m (thickness: 45 to 55 μm)

Example 3

2.5 mg of dibutyltin dichloride as a catalyst and 12.4 mg of Zelec UN (product name, acid phosphoric acid alkyl ester, a product of Stepan Company) as an internal release agent were added to 6.1 g of 2,4-tolylene diisocyanate in advance, and the contents were dissolved to give a monomer mixed solution. Next, 6.3 g of 4-mercaptomethyl-1,8-dimercapto-3,6-dithiaoctane was added thereto, and the contents were well mixed to give a monomer mixed solution. The monomer mixed solution was degassed under reduced pressure for 1 hour. A Kapton tape of 80 μm was affixed to four sides of a blue plate glass in a frame shape to build a wall, the monomer mixed solution was added dropwise to the inside of the wall, and a plate glass of the same size was further placed from the top. It was confirmed that the inside of the Kapton tape wall was filled with the monomer mixed solution, and then two plates of glasses with the solution sandwiched between them were fixed with a clip. The resulting material was subjected to a temperature elevation from 20 to 120 degrees centigrade slowly and cured over 13 hours. After cooling, a film was obtained by peeling it off from the glass. The resulting film was colorless and transparent.

Example 4

2.4 mg of dibutyltin dichloride as a catalyst and 11.9 mg of Zelec UN (product name, acid phosphoric acid alkyl ester, a product of Stepan Company) as an internal release agent were added to 5.6 g of 2,4-tolylene diisocyanate in advance, and the contents were dissolved to give a monomer mixed solution. Next, 6.3 g of the polythiol compound (B-2) synthesized according to the method described in Production Example 1 was added thereto, and the contents were well mixed to give a monomer mixed solution. The monomer mixed solution was degassed under reduced pressure for 1 hour. A Kapton tape of 80 μm was affixed to four sides of a blue plate glass in a frame shape to build a wall, the monomer mixed solution was added dropwise to the inside of the wall, and a plate glass of the same size was further placed from the top. It was confirmed that the inside of the Kapton tape wall was filled with the monomer mixed solution, and then two plates of glasses with the solution sandwiched between them were fixed with a clip. The resulting material was subjected to a temperature elevation from 20 to 120 degrees centigrade slowly and cured over 13 hours. After cooling, a film was obtained by peeling it off from the glass. The resulting film was colorless and transparent.

Example 5

In a water bath at 50 degrees centigrade, 10.0 mg of dibutyltin dichloride as a catalyst and 100 mg of Zelec UN (product name, acid phosphoric acid alkyl ester, a product of Stepan Company) as an internal release agent were added to 41.3 g of 2,4-tolylene diisocyanate in advance, and the contents were dissolved to give a monomer mixed solution. Next, 58.7 g of the polythiol compound (B-3) synthesized according to the method described in Production Example 2 was added thereto, and the contents were well mixed to give a monomer mixed solution. The monomer mixed solution was degassed at 50 degrees centigrade under reduced pressure for 15 minutes. A Kapton tape of 80 μm was affixed to four sides of a blue plate glass in a frame shape to build a wall, the monomer mixed solution was added dropwise to the inside of the wall, and a plate glass of the same size was further placed from the top. It was confirmed that the inside of the Kapton tape wall was filled with the monomer mixed solution, and then two plates of glasses with the solution sandwiched between them were fixed with a clip. The resulting material was subjected to a temperature elevation from 50 to 120 degrees centigrade slowly and cured over 22 hours. After cooling, a film was obtained by peeling it off from the glass. The resulting film was colorless and transparent.

Example 6

In a water bath at 60 degrees centigrade, 2.3 g of hexamethylene diisocyanate, 5 mg of dibutyltin dichloride as a catalyst, 225 mg of dibutyl phosphate as an internal release agent and 25 mg of monobutyl phosphate were added to 35 g of heat-melted m-phenylene diisocyanate in advance, and the contents were dissolved to give a monomer mixed solution. Next, 62.7 g of the polythiol compound (B-3) synthesized according to the method described in Production Example 2 was added thereto, and the contents were well mixed to give a monomer mixed solution. The monomer mixed solution was degassed at 60 degrees centigrade under reduced pressure for 5 minutes. A Kapton tape of 80 μm was affixed to four sides of a blue plate glass in a frame shape to build a wall, the monomer mixed solution was added dropwise to the inside of the wall, and a plate glass of the same size was further placed from the top. It was confirmed that the inside of the Kapton tape wall was filled with the monomer mixed solution, and then two plates of glasses with the solution sandwiched between them were fixed with a clip. The resulting material was subjected to a temperature elevation from 50 to 120 degrees centigrade slowly and cured over 24 hours. After cooling, a film was obtained by peeling it off from the glass. The resulting film was colorless and transparent.

placed from the top. It was confirmed that the inside of the Kapton tape wall was filled with the monomer mixed solution, and then two plates of glasses with the solution sandwiched between them were fixed with a clip. The resulting material was subjected to a temperature elevation from 20 to 120 degrees centigrade slowly and cured over 22 hours. After cooling, a film was obtained by peeling it off from the glass. The resulting film was colorless and transparent.

Respective physical properties of respective resulting films are shown in Table 1.

TABLE 1

|  | Example 1 | Example 3 | Example 4 | Example 5 | Example 6 | Example 7 |
|---|---|---|---|---|---|---|
| Monomer composition (g) | A-1 (36.4) B-1 (33.6) | A-2 (6.1) B-1 (6.3) | A-2 (5.6) B-2 (6.3) | A-2 (41.3) B-3 (58.7) | A-3 (35.0) A-4 (2.3) B-3 (62.7) | A-1 (44.5) B-3 (55.5) |
| Film thickness (μm) | 80 | 80 | 80 | 100 | 90 | 90 |
| S/N | 1.67 | 1.67 | 1.75 | 2.00 | 2.00 | 2.67 |
| Refractive index (D line) | 1.66 | 1.68 | 1.68 | 1.71 | 1.73 | 1.69 |
| Refractive index (e line) | 1.67 | 1.69 | 1.69 | 1.72 | 1.74 | 1.70 |
| Abbe's number (νd) | 31 | 25.4 | 24.6 | 25.5 | 24.5 | 31.1 |
| Transmittance-1 (Total light transmittance, haze meter) | 89 | 89 | 89 | 89 | 88 | 88 |
| Transmittance-2 (550 nm) | 89 | 89 | 88 | 88 | 88 | 88 |
| In-plane retardation (Re) (nm) | 0.8 | 0.6 | 0.5 | 0.5 | 0.4 | 0.7 |
| Solvent resistance (acetone, ethanol, cyclohexanone, toluene) | Not dissolved | Not dissolved | Not dissolved | Not dissolved | Not dissolved | Not dissolved |
| Coefficient of linear expansion (50 to 90 degrees centigrade) | 62 | 76 | 69 | 80 | 60 | 61 |
| TMA softening temperature (degrees centigrade) | 98 | 118 | 127 | 121 | 102 | 88 |
| Tensile modulus (GPa) | 3.8-4.1 | 2.7-3.2 | 2.9-3.3 | 2.0-3.4* | 3.4-3.8 | 4.1-4.6 |
| Breaking stress (MPa) | 90-120 | 15-116 | 15-31 | 14-90* | 116-125 | 133-136 |
| Breaking elongation (%) | 3.1-5.7 | 0.6-7 | 0.6-1.1 | 0.6-3.8* | 4.4-5.4 | 5.2-5.3 |

*A strip having a size of 5 cm × 5 mm was used for the measurement.

Abbreviations used in monomer compositions of Table 1 are shown below:
A-1: m-xylylene diisocyanate
A-2: 2,4-tolylene diisocyanate
A-3: m-phenylene diisocyanate
A-4: hexamethylene diisocyanate
B-1: 4-mercaptomethyl-1,8-dimercapto-3,6-dithiaoctane
B-2: Polythiol compound synthesized in Production Example 1
B-3: Polythiol compound synthesized in Production Example 2

Example 7

10.0 mg of dibutyltin dichloride as a catalyst and 100 mg of Zelec UN (product name, acid phosphoric acid alkyl ester, a product of Stepan Company) as an internal release agent were added to 44.5 g of m-xylylene diisocyanate in advance, and the contents were dissolved to give a monomer mixed solution. Next, 55.5 g of the polythiol compound (B-3) synthesized according to the method described in Production Example 2 was added thereto, and the contents were well mixed to give a monomer mixed solution. The monomer mixed solution was degassed under reduced pressure for 1 hour. A Kapton tape of 80 μm was affixed to four sides of a blue plate glass in a frame shape to build a wall, the monomer mixed solution was added dropwise to the inside of the wall, and a plate glass of the same size was further Example 8

A film was obtained in the same manner as in Example 1, except that the height of the Kapton tape wall was changed to 400 μm. The resulting film was colorless and transparent.

Example 9

A film was obtained in the same manner as in Example 1, except that the height of the Kapton tape wall was changed to 700 μm. The resulting film was colorless and transparent.

Example 10

A film was obtained in the same manner as in Example 5, except that the height of the Kapton tape wall was changed to 200 μm. The resulting film was colorless and transparent.

Example 11

A film was obtained in the same manner as in Example 6, except that the height of the Kapton tape wall was changed to 200 μm. The resulting film was colorless and transparent.

TABLE 2

| Monomer combination | | Film thickness (μm) | Birefringence in the thickness direction ($\Delta n_{xz}$) |
|---|---|---|---|
| Example 1 | A-1 B-1 | 80 | $7.5 \times 10^{-4}$ |
| Example 2 | A-1 B-1 | 80 | $6.3 \times 10^{-4}$ |
| Example 8 | A-1 B-1 | 350 | $8.5 \times 10^{-4}$ |
| Example 9 | A-1 B-1 | 670 | $9.3 \times 10^{-4}$ |
| Example 3 | A-2 B-1 | 80 | $5.1 \times 10^{-4}$ |
| Example 4 | A-2 B-2 | 80 | $6.0 \times 10^{-4}$ |
| Example 5 | A-2 B-3 | 100 | $4.8 \times 10^{-4}$ |
| Example 6 | A-3, A-4 B-3 | 90 | $6.1 \times 10^{-4}$ |
| Example 10 | A-2 B-3 | 180 | $5.6 \times 10^{-4}$ |
| Example 11 | A-3, A-4 B-3 | 190 | $6.6 \times 10^{-4}$ |
| Example 7 | A-1 B-3 | 90 | $4.6 \times 10^{-4}$ |

Example 12

10.5 mg of dibutyltin dichloride as a catalyst was added to 36.4 g of m-xylylene diisocyanate in advance, and the contents were dissolved to give a monomer mixed solution. Next, 33.6 g of 4-mercaptomethyl-1,8-dimercapto-3,6-dithiaoctane was added thereto, and the contents were well mixed to give a monomer mixed solution. The monomer mixed solution was degassed under reduced pressure for 1 hour, and then applied to a borosilicate glass with its surface cleaned by means of a UV ozone cleaning equipment using an applicator with a coating gap set at 60 μm. The monomer mixed solution was uniformly wet spread on the glass base material. The resulting material was subjected to a temperature elevation from 20 to 120 degrees centigrade slowly and cured over 13 hours. After curing was completed, the cured product was annealed at 120 degrees centigrade for 2 hours under a nitrogen atmosphere and placed under reduced pressure overnight. The thickness of the cured resin film was 50 μm. Thereafter, an ITO sputtered film was formed on the cured resin film. Using a target of $SnO_2$ (10 wt %), in a mixed atmosphere of argon and oxygen, the substrate temperature was set at room temperature to form an ITO film having a thickness of 150 nm on the cured resin film (sputtering apparatus for forming thin film, a product of ULVAC, Inc.). Furthermore, ITO directly formed into a film on the borosilicate glass was also prepared.

Example 13

10.5 mg of dibutyltin dichloride as a catalyst was added to 36.4 g of m-xylylene diisocyanate in advance, and the contents were dissolved to give a monomer mixed solution. Next, 33.6 g of 4-mercaptomethyl-1,8-dimercapto-3,6-dithiaoctane was added thereto, and the contents were well mixed to give a monomer mixed solution. The monomer mixed solution was degassed under reduced pressure for 1 hour, and then applied to the frosted surface of a Tempax one-side frosted glass plate (grit #320: concavo-convex height of 1 to 4 μm) cleaned by means of a UV ozone cleaning equipment using an applicator with a coating gap set at 120 μm. The monomer mixed solution was uniformly wet spread on the glass base material. The resulting material was subjected to a temperature elevation from 20 to 120 degrees centigrade slowly and cured over 13 hours. After curing was completed, the cured product was annealed at 120 degrees centigrade for 2 hours under a nitrogen atmosphere and placed under reduced pressure overnight. The thickness of the cured resin film was 120 μm. Thereafter, an ITO sputtered film was formed on the cured resin film. Using a target of $SnO_2$ (10 wt %), in a mixed atmosphere of argon and oxygen, the substrate temperature was set at room temperature to form an ITO film having a thickness of 150 nm on the cured resin film (sputtering apparatus for forming thin film, a product of ULVAC, Inc.). Furthermore, ITO directly formed into a film on the borosilicate glass was also prepared.

This application is based on Japanese patent application No. 2009-260449 filed on Nov. 13, 2009 and Japanese patent application No. 2010-067563 filed on Mar. 24, 2010, the contents of which are incorporated hereinto by reference.

The present invention includes the following embodiments:

(1) A film comprising a resin having a thiourethane bond, wherein the molar ratio (S/N) of sulfur to nitrogen contained in said resin is equal to or more than 0.8 and less than 3.

(2) The film according to (1), wherein the refractive index in a sodium D line is equal to or more than 1.6, the in-plane retardation Re of a film having a film thickness of 1 to 200 μm at a wavelength 590 nm is equal to or less than 10 nm, and the mean value of the light transmittance to the light having a wavelength 400 to 800 nm is equal to or more than 80%.

(3) The film according to (1) or (2), wherein the resin having a thiourethane bond has an aromatic group, a heterocyclic group or an alicyclic group in the structure.

(4) The film according to any one of (1) to (3), obtained by a casting method.

(5) An optical film composed of the film according to any one of (1) to (4).

(6) An optical member equipped with the optical film according to (5).

(7) A display equipped with the optical film according to (5).

(8) A light emitting device equipped with the optical film according to (5).

(9) A lighting device using the light emitting device according to (8).

(10) An image display device using the light emitting device according to (8).

Incidentally, the film of the present invention also includes a sheet-like one.

The invention claimed is:

1. A method for manufacturing a film comprising a resin having a thiourethane bond, comprising:
   a step of obtaining the film by a casting method from a mixture of a compound having isocyanate groups and a compound having mercapto groups which are capable of forming a thiourethane bond,
   wherein the molar ratio (S/N) of sulfur to nitrogen contained in said resin is equal to or more than 0.8 and less than 3,
   the compound having mercapto groups contains at least one kind of compound having three or more mercapto groups,
   the film has a thickness of from 0.1 to 200 μm, and
   the film has the birefringence $\Delta n_{xz}$ in the thickness direction at a wavelength 590 nm of equal to or less than $8.0 \times 10^{-4}$.

2. The method for manufacturing a film according to claim 1, wherein the compound having isocyanate groups has one or more functional groups which are selected from an aromatic group, a heterocyclic group and an alicyclic group in the structure.

3. The method for manufacturing a film according to claim 1, wherein the compound having isocyanate groups is selected from the group consisting of m-xylylene diisocyanate, 2,4-tolylene diisocyanate, m-phenylene diisocyanate and hexamethylene diisocyanate, and the compound having mercapto groups is one or more selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane and 1,1,3,3-tetrakis(mercaptomethylthio)propane.

4. The method for manufacturing a film according to claim 1, wherein film has the refractive index in a sodium D line of equal to or more than 1.6, the in-plane birefringence $\Delta n_{xy}$ of a film having a film thickness of 1 to 200 μm at a wavelength 590 nm of equal to or less than $1.0 \times 10^{-2}$, and the mean value of the light transmittance to the light having a wavelength 400 to 800 nm of equal to or more than 80%.

5. The method for manufacturing a film according to claim 1, wherein the film is optical film.

* * * * *